United States Patent [19]
Chase et al.

[11] Patent Number: 5,498,008
[45] Date of Patent: Mar. 12, 1996

[54] CHUCK JAW LOCKING APPARATUS FOR ROTATABLE MACHINE TOOL

[76] Inventors: R. Lee Chase, 16531 Wilderness, Cypress, Tex. 77429; Russell C. Chase, 6626 Guhn, Houston, Tex. 77040

[21] Appl. No.: 289,765

[22] Filed: Aug. 12, 1994

[51] Int. Cl.⁶ .............................. B23B 31/20; B23B 31/16
[52] U.S. Cl. ........................ 279/153; 279/123; 279/46.6
[58] Field of Search ..................................... 279/123, 124, 279/152, 153, 43.6, 46.6; 269/261, 262, 271, 279, 280, 282–284

[56] References Cited

U.S. PATENT DOCUMENTS 2,950,117  8/1960  Walmsley .................................. 279/123
3,744,809  7/1973  Bennett ..................................... 279/153

Primary Examiner—Steven C. Bishop
Attorney, Agent, or Firm—Gunn & Associates

[57] ABSTRACT

This disclosure is directed to a chuck system for a machine tool such as a lathe. It incorporates an elongate cylindrical body which terminates in a set of collet fingers having enlargements at the detail end whereby the enlargements define a circular body. The circular body is divided by slots to form collet fingers with enlargements at the ends of the collet fingers. A circumferential groove is formed having a registration shoulder for all of the lock jaw segments. Each lock jaw segment has a protruding tab. The tab is locked by positioning against the face of the groove and is registered against movement by jamming against a transverse post in the groove which shoulders against a conforming notch on the locking tab. A set screw holds the components in fixed location, and release is accomplished by unthreading the set screw.

19 Claims, 2 Drawing Sheets

CHUCK JAW LOCKING APPARATUS FOR ROTATABLE MACHINE TOOL

BACKGROUND OF THE DISCLOSURE

This disclosure is directed to a chuck jaw mounting apparatus for use with a rotating machine tool or stationary and more particularly to a set of soft jaws which are anchored in a fixed relationship to radially expanding master chuck jaws.

In machine tools, it is necessary to hold a work piece. The work piece must be positioned concentric about a centerline axis of rotation. The axis of rotation must also be aligned with the dead or live center of the machine tool. This can involve mills and lathes both. In a typical application, a lathe equipped with a headstock includes a rotating spindle which is threaded to a chuck mechanism. The chuck mechanism supports a set of master jaws which expands radially outwardly to grasp the work piece. Speaking very generally, the work piece may include a central opening so that the jaws are expanded on the interior into a gripping position. Generally, the jaws expand radially outwardly until an tight grip is achieved. The grip accomplished in the system enables holding the work piece upon expansion of the jaws.

Because different work pieces require different configuration such as shoulders, different diameters and so forth, many times expendable soft jaws are attached to the master jaws. A setup is required each time the soft jaws are replaced on the master jaws for alignment. Frequently, the soft jaws must be remachined to have precise alignment. One object of this invention is to reduce the alignment error of repetitive setups.

The soft jaws can be blanks i.e., a set of N jaws may be installed where N equals a whole number positive integer. N typically will be 3 and 4 and not more than 6 jaw pieces. If four jaws are used, each will encompass an arc of about 90° minus a small gap for clearance between adjacent jaws. Typically, a set of jaws is assembled for holding a work piece having an internal diameter within the specified range. One range can be 2–4 inches, and a larger version can then accommodate 4–6 inches. Another version which is larger yet and operating in the same fashion can accommodate larger sizes. The blanks are provided so they can be temporarily installed, measured and then cut to a specified or precise diameter. For instance, a set of blanks might normally accommodate a nominal 8 inch work piece. Given a work piece which requires jaws having an original diameter of 8 inches, they can be machined to any diameter which is less than that to accommodate a work piece of 7.000 inches to cite a particular example. Suffice it to say, the individual jaws are machined to provide a locking surface.

A locking surface can typically be part of a cylinder considering all of the jaws together or can be formed with a shoulder. In any case, the exposed soft jaw surface can be machined. It is important that the individual jaws be registered for collective holding of a work piece. The present disclosure sets forth a locking system which secures the individual jaw elements at relative precise locations. It is a location that can be achieved after assembly and disassembly any number of times. On each occasion, the jaws can be removed, perhaps stored for an interval and then repositioned on the chuck so that the jaws are registered. It is somewhat difficult to provide a registration surface for jaws in a circular chuck. One reason for this is that a round surface cooperating with a concentric jaw which is only a segment of a circle can easily elude precise registration. Because of the difficulties that arise from that, it is very difficult to achieve registration when reassembling the jaws. This occurs especially in the case where the jaws are machined so that the gap between the jaws is increased.

The present disclosure sets forth a locking and registration system which is associated with each soft jaw in a multiple jaw arrangement where the number of jaws is given by N. Accordingly, the N jaws are matched with N locking mechanisms in the chuck. The removable and replaceable chuck of the present disclosure thereby enables locking of N jaws in the machine tool. In one aspect of the present disclosure, the N jaws are deployed at equal spacing around the circumference of the chuck assembly. This positions each jaw accommodating a span of 360° divided by N jaws or 90° for a four jaw system. A six jaw system involves 60° spacing to pick another example. In a four jaw system, the present apparatus contemplates positioning of duplicate lock mechanisms at 90° spacing so that the jaws are properly aligned in the chuck assembly.

In one feature of the present disclosure, the several jaws can be assembled in any sequence. Each jaw is positioned on the chuck by placing the jaw on the body of the chuck so that the jaw is anchored without measurement. A lock pin is utilized for alignment purposes and it locks against a tab on the soft jaw. A set screw is used in which a point on the set screws wedges against the jaw jamming it against the lock pin. This assures registration. Registration in three dimensions is normally contemplated so that each detachable soft jaw is wedged against the lock pin, a set screw and a common surface for alignment of all jaws. In other words, there are N lock pins. Moreover, because the locking mechanism is set fixedly when installed by means of a set screw equipped with a pointed tip, wedging action is accomplished which jams the individual lock jaw into a confined location.

Expansion radially outwardly is then utilized in conjunction with the machined jaws so that the outer periphery of the several jaws accomplishes the restraint of the work piece.

IN THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may add to other equally effective embodiments.

DETAILED DESCRIPTION OF THE PREFERRED EMBODIMENT

Figure 1:
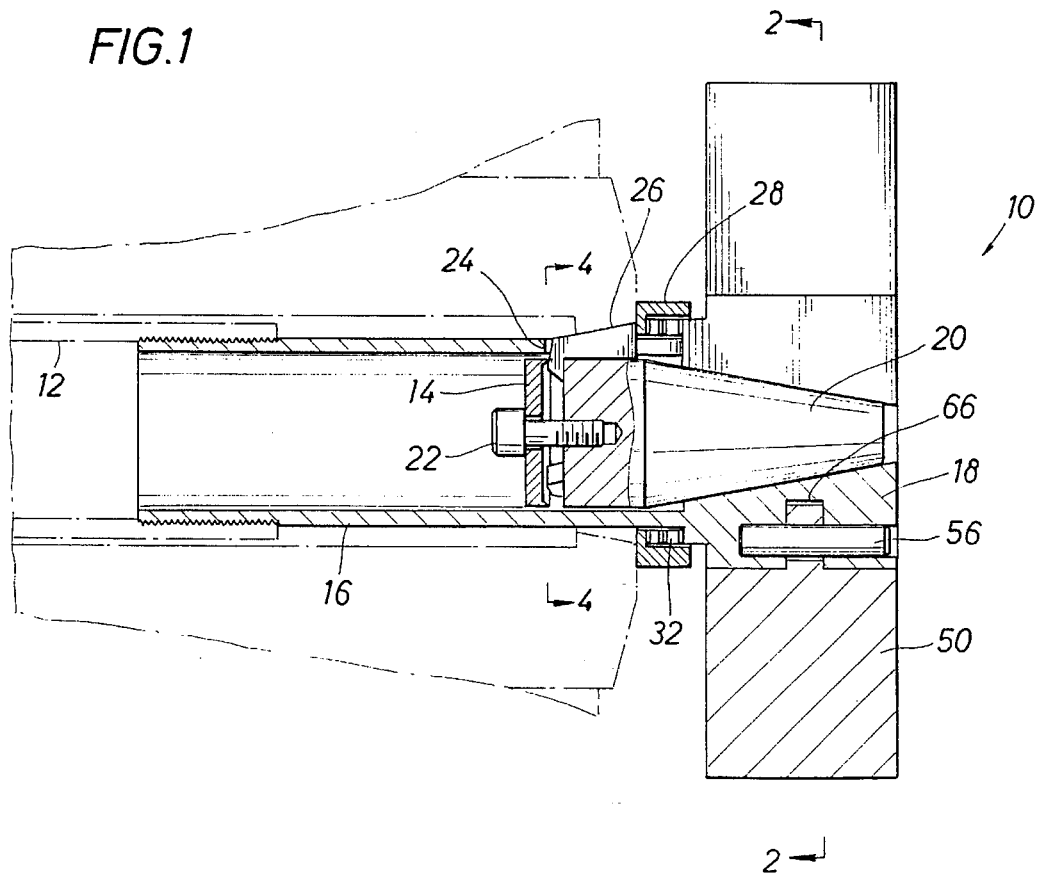
FIG. 1 is a sectional view through a multiple jaw chuck in accordance with the present disclosure mounted to a rotating spindle in a machine tool to grip a work piece which is positioned around the independent jaws.

Attention is first directed to FIG. 1 of the drawings where the numeral 10 identifies the chuck of the present disclosure. It is typically mounted on a draw tube 12 to a rotatable, live head stock 12 of a machine tool. A typical machine tool is a lathe although the apparatus will also cooperate with other rotating mechanisms such as a milling machine. In any event, the chuck assembly 10 is threaded to the rotating draw tube or head stock so that it can support a work piece (not shown) and rotate the work piece for cutting threads, or other machining steps in processing of the work piece.

Proceeding from left to right in FIG. 1 of the drawings, an elongate sleeve 16 is integrally constructed with a solid cylindrical body 18 shown at the right hand side of FIG. 1 of the drawings. A disk 14 is positioned on the interior of the sleeve and is spaced from a concentric or conic taper 20. The taper 20 is pulled towards the disk by a machine screw 22 in the disc 14. Movement of the taper 20 operates the locking mechanism in a fashion to be described.

Figure 4:
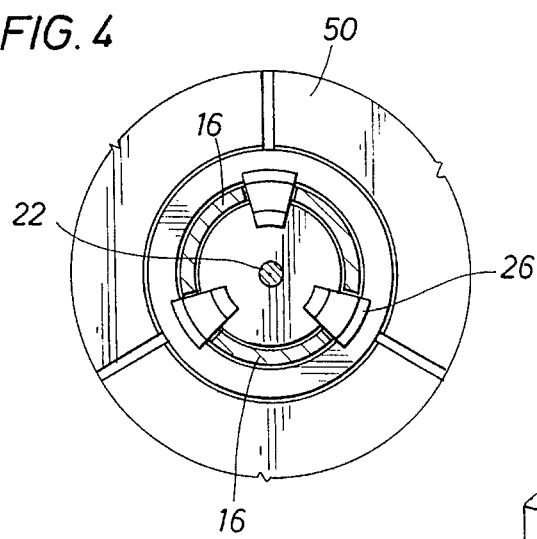
FIG. 4 is a sectional view along the line 4—4 in FIG. 1 of the drawing and showing details of construction of an expandable collet mechanism.

The sleeve 16 is formed with windows at selected locations. One window is identified at 24, and there are similar windows spaced evenly around the circumference. A locking dog 26 extends through the window. The dog 26 has an end face adjacent to a confinement ring 28 which is positioned around a compressed spring 32 formed of Bellville washers or other spring material. Briefly, the confinement ring 28 surrounds the spring 32. It assures that the spring 32 imparts an axial load on the ring 28 which in turn abuts the tapered dogs 26. The dogs 26 extend outwardly through windows formed in the cylindrical sleeve, thereby permitting the conic taper 20 to move with the dogs 26. In a typical construction, there are three dogs in three equally spaced windows. This will be discussed with regard to FIG. 4 in some detail.

Because the cylindrical sleeve 16 is an elongate hollow member which is provided with a window 24 in the preferred form of construction, the slot from the window extends through the cylindrical sleeve 16 and ends at 24 in FIG. 1 of the drawings. The slot extends backwardly through the solid cylindrical body 18. There are preferably three slots although the number can clearly be varied so long as it permits even spacing of windows around the circumference to permit the dogs to extend through the slots. In the region of the dogs 26, the slots are made sufficiently wide to permit free movement of the dogs. The slots extend along the body 18 to divide the body into segments. If there were four slots at 90° spacing, then the body 18 would be divided into four components. That particular aspect of the structure is shown in the sectional view of FIG. 2 of the drawings. There, the body 18 is shown divided into three because there are three slots. The slots extends from the area shown in FIG. 1 of the drawings completely to the back face of the body 18 and thereby define N collet fingers attached to the cylindrical sleeve 16. The several slots are preferably equal in width and length. The collet fingers are able to deflect radially inwardly or outwardly. As observed in FIG. 2 of the drawings, the gap 36 becomes smaller or larger depending on the movement of the segment portions of the sleeve 16. Again, it is helpful to describe the body 18 as being comprised of N circular segments which collectively form a set of collet fingers.

Figure 3:
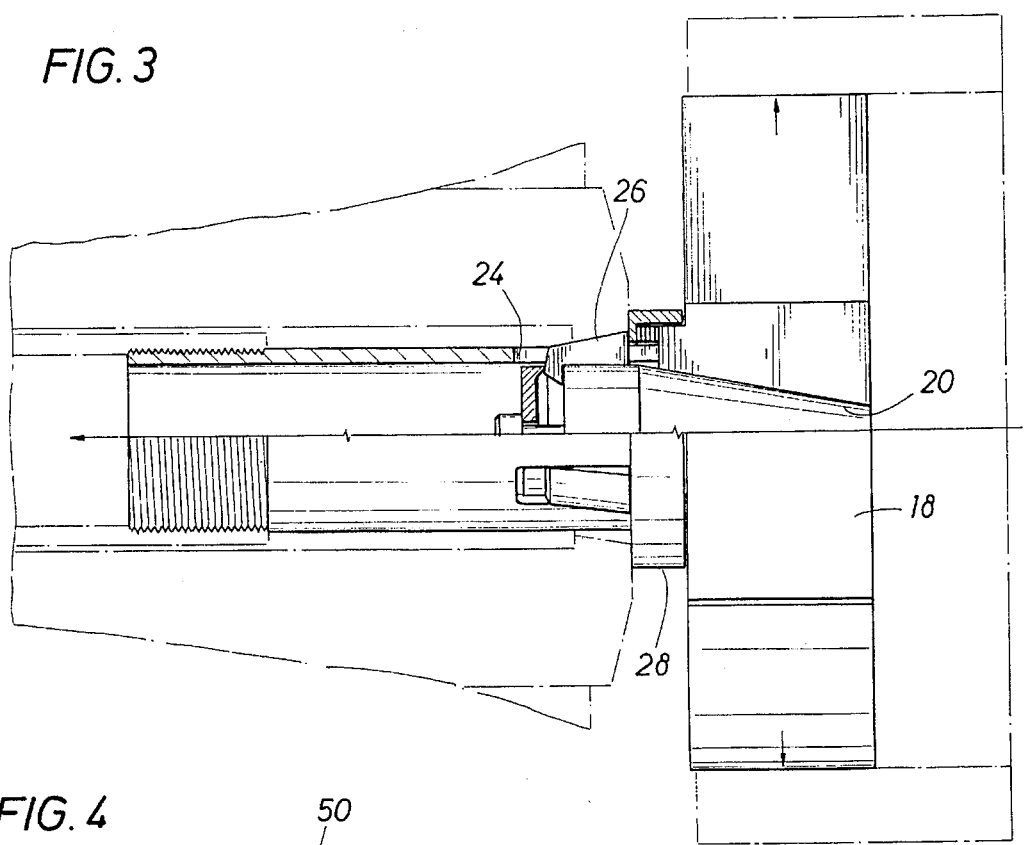
FIG. 3 is a view of similar to FIG. 1 of the drawings showing the expanded jaws in comparison with the position shown in FIG. 1 of the drawings.

In one aspect of the present disclosure compare FIGS. 1 and 3. The taper 20 is shown in a shifted position with respect to the body 18 which again is part of the collet fingers. It will be observed that the dogs 6 are in a different location, relatively speaking. The ring 28 serves as a stop or limit mechanism for movement of the taper to the right with respect to the body 18, or stated in the opposite fashion, movement of the body. Before the ring 28 bottoms out, the spring on the interior compresses and prevents excessive movement to the parts.

SOFT JAW REGISTRATION SYSTEM

One important aspect of the present disclosure is the incorporation of sacrificial soft jaws, the number preferably being N where the N soft jaws are installed around the chuck mechanism. There are three soft jaws in the illustrated embodiment and that is an accepted arrangement for most machine tools. As stated, this can be extended to a different quantity. As stated, they are provided as blanks and can be machined to a reduced diameter, provided with an external step, or otherwise made to conform with a work piece. In any event, the several soft jaws are identical and are registered in the same fashion. Furthermore, the identical soft jaws are registered so that the soft jaws can be easily attached to the chuck without the use of any measuring tools or other alignment mechanism. Attachment is relatively easy, and detachment is likewise just as easy.

In one broad aspect, the invention pertains to a clamping mechanism for holding a work piece on a rotable machine tool for machining by a cutter. The apparatus comprises a demountable chuck having movable master jaws, multiple soft jaws attached to the master jaws to support a work piece, and registration means releasably clamping the soft jaws with respect to the master jaws in repetitive fashion to assure that the soft jaws, after removal and reinstallation, are returned to a registered position with respect to the master jaws. The registration means includes a registration pin, the surface of which define one of the registration means, a second registration pin and a cooperative pin receiving surface defining a second registration means and a fixed face on the master jaws defining a third registration means. The second registration means includes a spaced and separated cooperative means defining a clamp means preventing soft jaw movement after installation.

The invention further pertains to a method of registering blank work pieces on a table relative to a cutter. The method includes the steps of placing blank soft jaws in a chuck having master jaws in a spatial relationship to the cutter, machining the soft jaws to form blank work piece supporting shoulders to support and hold at the same location work pieces repetitively registered to enable duplicate work piece conversion into a machined part. During the step of placing the blank soft jaws, the method includes positioning the soft jaws at fixed locations relative to the master jaws, registering the soft jaws on the master jaws with respect to a reference system, and clamping the soft jaws to prevent movement by positioning a registration pin to hold a soft jaw against a movement, and also positioning a second registration pin to also hold the soft jaw against movement.

More particularly, the present disclosure sets forth a chuck. A chuck opening mechanism is ordinarily included, and the chuck typically includes a base plate which has a means enabling connection to slots on the machine. The fixed or master jaws support registration pins. Conveniently, one of the pins is a simple round dowel. A pointed or tapered set screw point locks a protruding mounting bracket on a soft jaw when the pointed set screw, registers in an enlarged conic cavity. Clamping action by the pin and set screw engagement register the soft jaw repetitively at the same location with great accuracy. This assists in positioning the soft jaw at a fixed location. Given the fact that the soft jaw is later machined with faces and shoulders conforming to the work piece, the machinist is therefore able to set up the equipment for repetitive operation time and again, and thereby remount the soft jaws in precisely the correct location.

Figure 2:
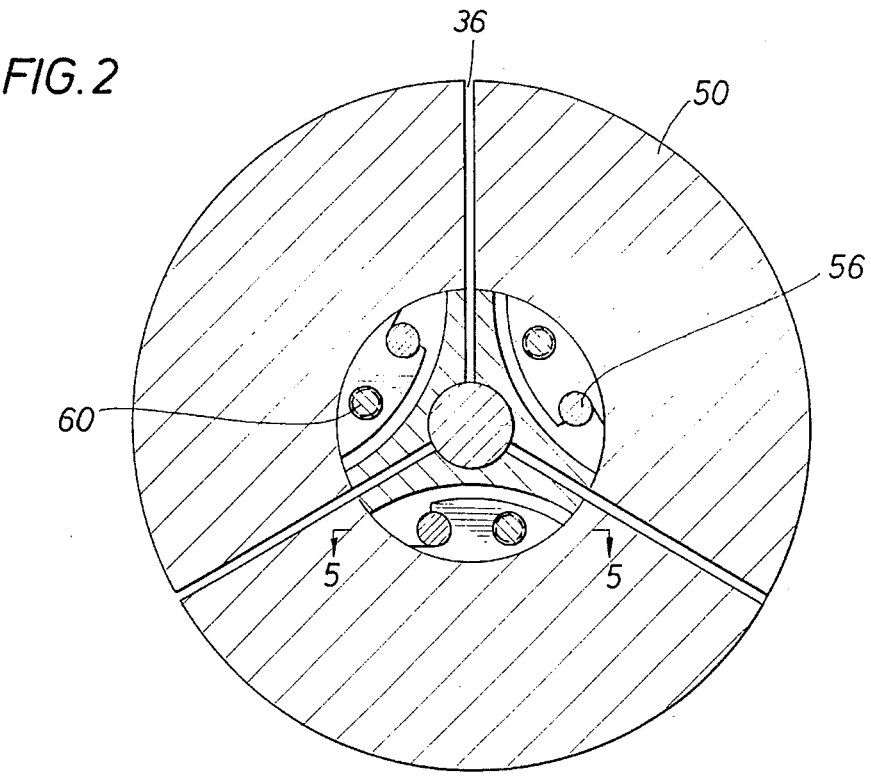
FIG. 2 is a sectional view along the line 2—2 of FIG. 1 of the drawings showing a lock pin and tapered set screw locking mechanism replicated for each of several identical removable jaws.
Figure 5:
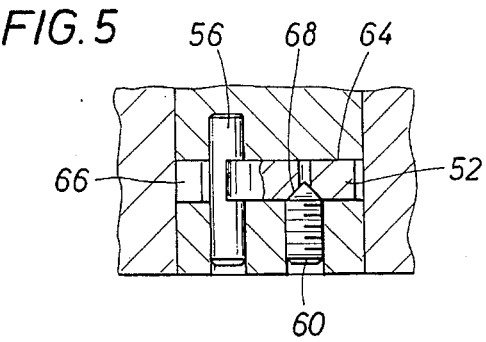
FIG. 5 is a sectional view along the line 5—5 of FIG. 2 of the drawings showing details of construction of the lock pin mechanism.
Figure 6:
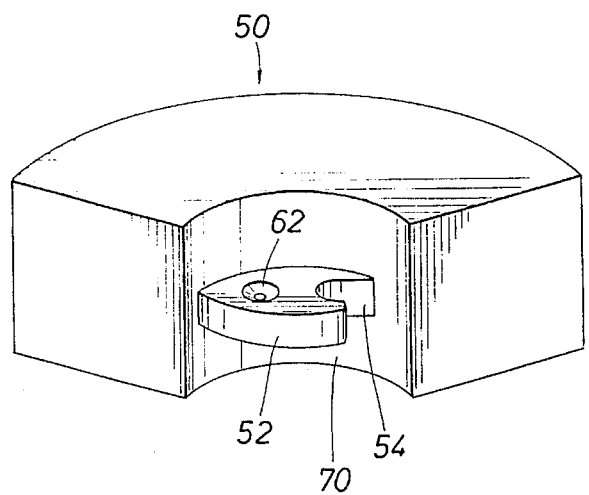
FIG. 6 is a detailed view which shows an individual soft jaw with a lock tab protruding from it which engages the lock pin shown in FIG. 5 of the drawings.

With that goal in view, and directing attention now to FIG. 6 of the drawings, an individual soft jaw 50 is shown at that location. The soft jaw 50 has a curving outer face which abuts against the work piece. That is the region at which machining is implemented to change the shape of the jaw. The soft jaw 50 has a protruding lock tab 52. The tab 52 has a conforming notched end 54 which enables the soft jaw 50 to be attached. The curvature in the notch 54 fits around a registration pin 56 better shown in FIG. 5 of the drawings. The pin 56 is also shown in FIG. 2 of the drawings. It will be noted in that view that the individual lock jaw 50 is registered in circumferential position with respect to the chuck. So to speak, and referring to FIG. 2 of the drawings, the soft jaw must be rotated in a clockwise direction. When that occurs the notch 54 registers against the lock pin 56. To assure locking, a second registration is accomplished by means of the pointed set screw 60 is then threaded into position. The set screw 60 has a point which threads into the tab 52 and is received at a chamfered dimple 62 better shown in FIG. 6. For ease of machining, a pilot hole is optionally drilled fully through the tab 52. When this is done, the tab 52 is forced into alignment. Alignment is achieved because the set screw must be threaded to extend against the chamfered surface 62. This is accomplished by moving the tab 52 against the pin 56 as observed in FIG. 5. This movement is accomplished with compensatory sliding movement of the tab 52. Referring to FIG. 5, the registration set screw forces the tab 52 to jam upwardly against the abutting surface 64, which serves as a third registration surface. The surface 64 enables sliding movement (left or right in FIG. 5) of the tab 52 to assure registration. That movement assures registration of the soft jaw 50 by holding the tab 52 fixed in position. Going back now to FIG. 2 of the drawings, the set screw 60 is again shown in spaced relationship to the pin 56. As will be understood, the same type of mechanism is used for all of the N soft jaws.

As shown in FIG. 2 of the drawings, the curving notch 54 appears to contact the pin 60 on approximately one-half of the circumference. In actuality, the pin 60 fitting in the curving surface 54 does not provide contact through approximately 180° of the notch 54. Rather a pinching movement is accomplished. This pinching movement is achieved between the locking pin 56 and the notch 54. That locking or pinching movement at one end of the tab 52 is countered by the pinching movement at the tab 52. More specifically, the pinching movement grasps the tab. The notch 54 diameter is slightly larger than the pin 56. The pin 56 forms a line of contact. This line of contact is relatively narrow and is not broadly distributed; the line of contact has a location which is along the pin 56 and holds the lock tab 52 in the pinched position.

Looking at FIG. 6 of the drawings, the dimpled or dished area 62 receives the point of the set screw. Again, it is somewhat difficult to draw but the pointed set screw ideally operates by forming a region of contact. As the set screw is advanced by threading, the point engages the dimple region to move the tab 52. This creates an area of contact or jamming in the dimple region which is localized. So to speak, the pointed set screw jams against the dimple region and forces the lock tab with pinching movement. This movement assures clamping. Accordingly, FIG. 5 of the drawings is best understood by observing that the portion of the dimple at 68 is jammed towards the lock pin 56. This area of contact is relatively narrow and is not the full conic surface available. Indeed, if the point of the set screw were to be perfectly concentric with and jammed into the conic receptacle, the locking action which is actually achieved would be defeated. It is dependent on the ever so slight motion in the pinching action.

To summarize, the lock tab 52 is not free to move in any direction at the urging of the two forces which are applied to it. The two forces are from the pinching action just mentioned. Viewed in FIG. 5 of the drawings, the pin 56 at the left is jammed into a line contact on the curvature 54 while the area of contact 68 in the dimpled receptacles 62 is strictly localized. The two actions just mentioned comprise the pinching movement detailed above. This assists in jamming the tab upwardly as shown in FIG. 5 of the drawings to firmly jam or abut the opposing surface 64. Likewise, the tab 56 is pulled radially inwardly of the entire structure so that the surface 70 shown in FIG. 6 is jammed into registration. Summarizing, the surfaces 64 and 70 are at right angles with respect to each other, and the pinching movement described with respect to the tab 52 completes the locking transaction.

Going now to operation of the device 10, the individual soft jaws can be removed readily. The body 18 includes the set of enlargements at the end of a set of N collet fingers, the collet fingers can flex within a specified range. The segments are located internally of the ring 28 which is located immediately adjacent to the set of dogs 26. As observed in FIG. 4 of the drawings, the dogs 26 are arranged with respect to the cylindrical sleeve 16 so that they extend radially outwardly into the locking position illustrated in FIG. 3 of the drawings. Moreover, the several dogs are able to move in the respective windows provided for them, comparing the relative positions as shown in FIGS. 1 and 3 when viewed in contrast. This type of movement accommodates a locking step in which the soft jaws 50 can be momentarily pressed inwardly as would occur in the deployment of the tapered cone 20 in FIG. 1 and then they move outwardly as illustrated in the comparative aspects of FIG. 3. In both instances, it will be observed that the dogs 26 have been forced towards the right hand end of the respective windows provided for them. That movement is accompanied by pulling the bolt 22 toward the tapered cone 20.

Operation of the device involves the positioning of the protruding tab 52 in the groove (FIG. 1) which is provided for that purpose. That groove 66 is observed in FIG. 5 of the drawings. The groove is formed in the enlarged cylindrical body 18 which is divided into N segments at the end of the collet fingers. Moreover, that construction permits the several lock jaws to be attached quickly and easily because the only motion that is required to align the tab 52 in the groove 66 is to insert the tab 52 into the groove 66, and register the notch 54 against the pin 56. At that juncture, the set screw is then threaded into the required relationship, this being readily accomplished with an Allen wrench of the appropriate size. This locks the soft jaw 50 into position. Referring now to FIG. 1 of the drawings, it will be observed there that the soft jaw is registered left and right with respect to the groove 66 provided for the tab 52 in the body 18. This locking motion readily secures this jaw for quick assembly. Disassembly is easily accomplished by use of the same Allen wrench to unthread the set screw 60. The soft jaw 50 can then be pulled freely from the required installation location. Disengagement is accomplished easily because the width of the slot 36 shown in FIG. 2 of the drawings is sufficiently large that the encircling notch 54 against the alignment pin 56 is disengaged. As will be understood, if the notch 54 reached entirely around the pin 56, release would not be readily possible. As viewed in FIG. 2 of the drawings, it is necessary to slide the jaw 50 away from the alignment pin 56. That can be done easily.

A first set of soft jaws can be used for particular work piece. This may require the use of the jaws for manufacture of several hundred duplicate work pieces. Then they can be stored until the next production run. An alternate set of jaws can be installed. They can be used until the next occasion. With adequate storage, an unlimited number of jaws can be stored for different types or shapes of work pieces. Removal and installation of an alternate set can be accomplished as described. In summary, the foregoing is directed to the preferred embodiment but the scope is determined by the claims which follow.

We claim:

1. A machine tool chuck jaw mounting system comprising:
   (a) a demountable chuck having at least two removable and replaceable master jaws;
   (b) at least two soft jaws fixedly anchored with respect to the master jaws to support a work piece; and
   (c) a registration means releasably holding the soft jaws with respect to the master jaws in repetitive fashion to assure that the soft jaws, after removal and reinstallation, are returned to a registered position with respect to the master jaws said registration means comprising:
      (1) a registration pin on said master jaw and having an external surface defining a first clamping surface;
      (2) a spaced registration member and a cooperative receiving surface located to define a second clamping surface;
      (3) an alignment area on said master jaws for receiving and fixedly holding said soft jaws;
      (4) wherein said first and second clamping surfaces cooperative with a registration pin prevent soft jaw movement after installation;
      (5) a tapered point on a set screw to engage a co-acting chamfered surface to force soft jaw registration;
      (6) wherein registration is in three dimensions; and
      (7) wherein radial jaw movement restrains the work piece.

2. The apparatus of claim 1 wherein said alignment area includes said first and second clamping surfaces at right angles.

3. The apparatus of claim 1 wherein said clamping surfaces limit the movement of said soft jaws.

4. The apparatus of claim 1 wherein said soft jaws each include a protruding lockable tab extending into registered contact with said master jaws.

5. The apparatus of claim 4 wherein said soft jaws include a lock tab engaged by said clamping surfaces.

6. The apparatus of claim 4 wherein said tab is received in a mating slot in said master jaws and one of said clamp surfaces is located in said slot.

7. The apparatus of claim 6 wherein said tab and said slot permit sliding movement along said slot until said alignment-area limits such movement.

8. The apparatus of claim 1 wherein said soft jaw elements are individually registered.

9. The apparatus of claim 1 wherein said individual soft jaw elements are secured at relatively precise positions.

10. The apparatus of claim 1 wherein said individual soft jaw elements are assembled in any sequence.

11. The apparatus of claim 1 wherein said soft jaw elements are anchored relatively precisely without measurement.

12. A method of registering blank work pieces in a chuck relative to a cutter comprising the steps of:
   (a) mounting a set of blank soft jaws on the master jaws of a chuck in a spatial relationship to the cutter;
   (b) machining the soft jaws to support and hold at the same location work pieces repetitively registered to enable duplicate work piece conversion into a machined part;
   (c) during mounting of the blank soft jaws, positioning the soft jaws at specific locations relative to the master jaws, wherein this step including the steps of:
      (1) placing the soft jaws at fixed locations on the master jaws;
      (2) registering the soft jaws on the master jaws with respect to a reference system; and
      (3) clamping the soft jaws to prevent soft jaw movement, wherein the step of clamping includes advancing a tapered point to force the soft jaws into a registered position.

13. The method of claim 12 wherein the tapered point is on a set screw and engages a co-acting chamfered surface to force soft jaw registration.

14. The method of claim 12 wherein the tapered point cooperatively pushes the soft jaw against a cooperative surface.

15. A chuck for a work piece comprising;
   (a) a central master jaw;
   (b) a soft jaw having a surface for supporting a work piece;
   (c) means for securing said soft jaw in place on said master jaws and comprising:
      (1) an alignment area on said soft jaw;
      (2) a conforming area on said master jaw cooperatively abutting said soft jaw alignment area; and
      (3) a clamp releasably holding said soft jaw so that said conforming area is held in the abutted relationship indefinitely and repetitively, said clamp having first and second surfaces spaced to grasp and clamp said soft jaw, and wherein said soft jaw has a protruding tab having said first and second surfaces spaced along said tab and further comprising a portion of said protruding tab, and said tab fits said master jaw slot.

16. The apparatus of claim 15 wherein said slot includes facing slot defining walls, and said walls confine said tab registered in location along said slot.

17. The apparatus of claim 16 wherein said clamp locates said first surface in said slot, and said second surface is spaced along said slot; said first and second surfaces are curved surfaces.

18. The apparatus of claim 17 wherein said conforming area comprises two surfaces at fight angles in said slot.

19. The apparatus of claim 18 wherein one of said right angle surfaces is a slot defining wall.

* * * * *